United States Patent Office 3,411,874
Patented Nov. 19, 1968

3,411,874
ZSM-2 ZEOLITE AND PREPARATION THEREOF
Julius Ciric, Glassoboro, N.J., assignor to Mobil Oil
Corporation, a corporation of New York
No Drawing. Filed Nov. 9, 1964, Ser. No. 409,640
7 Claims. (Cl. 23—113)

ABSTRACT OF THE DISCLOSURE

A novel crystalline aluminosilicate composition having a silica to alumina mol ratio of 3.3 to 4 and a specified X-ray diffraction pattern prepared by contacting a finely divided amorphous glass having a chemical composition, defined by the following molar ratios, of (2 to 6)$LiO$:$Al_2O_3$:(4 to 9)$SiO_2$ with excess water at a temperature between 20 and 100° C. until crystals of said aluminosilicate are formed.

---

This invention relates to a novel class of crystalline aluminosilicates and method for preparing the same. More specifically, the present invention relates to new crystalline lithium aluminosilicates, methods for modifying such materials and their use in conducting catalytic conversion.

Both natural and synthetic crystalline aluminosilicates are known and may generally be described as metal aluminosilicates of ordered internal structure having the following general formula:

$$M_{2/n}O \cdot XAl_2O_3 \cdot YSiO_2 \cdot ZH_2O$$

where $n$ is the valence of the metal cation M, $Y/X$ is the silica to alumina mole ratio and $ZH_2O$ is the water of hydration.

When water is removed from the above crystalline aluminosilicates, highly porous crystalline bodies are formed which contain extremely large adsorption areas inside each crystal. Cavities in the crystal structure lead to internal pores and form an interconnecting network of passages. The size of the pores of such crystalline materials is substantially constant, and this property has led to the use of crystalline aluminosilicates for the separation of materials according to molecular size or shape. For this reason, the foregoing crystalline aluminosilicates have sometimes been referred to as molecular sieves.

The crystalline structure of such molecular sieves consists basically of three dimensional frameworks of $SiO_4$ and $AlO_4$ tetrahedra. The tetrahedra are cross-linked by the sharing of oxygen atoms and the electrovalence of the tetrahedra containing aluminum is balanced by the inclusion in the crystal of a cation, for example, an ion of an alkali metal, or alkaline earth metal or other cationic metals and various combinations thereof. The cations of such crystalline zeolites are generally readily replaced by conventional ion-exchange techniques.

The spaces in the crystals between the tetrahedra ordinarily are occupied by water. When they are treated to remove the water, the space then remaining in the crystal after the water is removed is available for adsorption of other adsorbate molecules of a size and shape which permits their entry into the pores of the aluminosilicate structure.

Molecular sieves have found application in a variety of processes which include ion exchange, selective adsorption and separation of compounds having different molecular dimensions, for example hydrocarbon isomers, and more recently, in the catalytic conversion of organic materials and especially in catalytic cracking processes.

It is the primary object of the present invention to provide a new crystalline aluminosilicate and a method for synthesizing the same.

It is a further object of this invention to provide novel crystalline aluminosilicates having utility as molecular sieves and as catalysts for various organic conversions and particularly for the cracking of hydrocarbon charge materials.

The present invention comprises a new crystalline aluminosilicate and a method for preparing the same from an amorphous glass composition. It has been discovered that certain amorphous $Li_2O$—$Al_2O_3$—$SiO_2$ glasses undergo hydration by prolonged contact with water to form a novel and heretofore unknown species of crystalline aluminosilicates. Without being limited by any theory, it is believed that the crystalline aluminosilicate is most likely formed by dissolution of the glass and growth of crystals from dissolved alumina and silica. The new crystalline aluminosilicate so obtained has been designated and is hereinafter referred to as ZSM-2 zeolite, and is characterized by specific X-ray crystal diffraction patterns and the following chemical formula:

$$M_{2/n}O \cdot Al_2O_3 \cdot 3.3\text{-}4.0SiO_2 \cdot ZH_2O$$

The crystalline aluminosilicate compositions obtained by the process of the invention are prepared from glass compositions of varying ratios of lithium oxide, aluminum oxide and silicon dioxide. The aluminosilcate compositions obtained afford substantially the same X-ray pattern when subjected to X-ray analysis. These patterns can be indexed in the crystalline tetragonal system.

In general, the present invention comprises prolonged dissolution of a $Li_2O$—$Al_2O_3$—$SiO_2$ glass of particularly defined composition with water under controlled conditions of temperature until crystals appear and thereafter recovering the crystals.

The $Li_2O$—$Al_2O_3$—$SiO_2$ amorphous glass utilized in synthesis of ZSM-2 zeolite has a composition defined by the following molar ratios:

| $Li_2O$ | $Al_2O_3$ | $SiO_2$ |
|---|---|---|
| 2 to 6 | 1 | 4 to 9 |

Dissolution of the glass is desirably carried out in the presence of excess water. The amount of water present is imporant since it affects the rate of dissolution of the glass and hence the extent of crystallization. In the presence of an amount of water merely sufficient to wet the glass, crystallization is achieved only after elapse of excessively long time. Generally, the weight ratio of water to solids in the slurry is in excess of 1 and more particularly in the range of 2 to 15.

The temperature at which digestion of the water-glass slurry is effected appears to be of considerable importance. Such temperature is generally within the range of 20° C. to 100° C. Preferably, the digestion is initially accomplished at a temperature between about 20° C. to about 30° C. Such low temperatures have been found to favor nucleation of the species ZSM-2. It has been established that by initiating crystallization at such low temperatures in the approximate range of 20° C. to 30° C. and continuing crystallization at an elevated temperature within the foregoing range, ZSM-2 is crystallized in preference to other species.

Contact between the water and amorphous lithium aluminosilicate glass is preferably, but not necessarily, carried out under conditions of agitation, with the glass being in finely divided form generally of a size between about 100 and 400 mesh (Tyler) for maximum exposure of surface area to contact with the water. Slurrying of the glass-water mixture is preferably accomplished in a container, having surfaces exposed to such mixture of non-glass composition.

The resulting crystalline ZSM-2 zeolite is characterized by a distinctive X-ray diffraction pattern hereinafter set forth and a uniform pore size in the range of about 7 to about 14 Angstroms.

The following examples more fully illustrate the method and composition of matter of this invention. These examples are preferred embodiments but are not intended to limit the scope of the invention.

EXAMPLE 1

Ten grams of an amorphous $Li_2O$—$Al_2O_3$—$SiO_2$ glass, the oxide mol ratio composition of which was 4:1:9, was slurried with 50 ml. of deionized water in a polypropylene bottle. The bottle and contents were allowed to stand at room temperature (about 20° C.) for approximately 48 hours and thereafter were tumbled at 1–2 r.p.m. in a water bath maintained at 55–60° C. After 30 days, the contents were examined under a microscope and were found to contain about 50 percent crystals, approximately ½ micron in size, the balance being unreacted glass. The crystals were separated by sedimentation in an aqueous slurry. The structure of the crystals thus obtained was determined by X-ray diffraction analysis, the results of which are tabulated in Table I. The crystalline aluminosilicate product 80 characterized was designated ZSM–2 zeolite. The crystal pattern thereof can be indexed in the tetragonal system with the parameters $a_0 = 27.4$ A., $c_0 = 28.1$ A. The product showed a cyclohexane sorption of 15 percent by weight and water sorption of 22 percent by weight.

TABLE I.—X-RAY ANALYSIS OF PRODUCT OF EXAMPLE 1

| Line | 2θ | h k l | 100 I/I₀ | d(A.) |
|---|---|---|---|---|
| 1 | 6.30 | 002 | 83 | 14.0 |
| 2 | 6.42 | 200 | 76 | 13.8 |
| 3 | 7.24 | 210 | 42 | 12.2 |
| 4 | 10.17 | 310 | 47 | 8.70 |
| 5 | 12.05 | 321 | 37 | 7.34 |
| 6 | 12.52 | 004 | 41 | 7.07 |
| 7 | 12.92 | 400 | 8 | 6.85 |
| 8 | 15.73 | 005 | 85 | 5.63 |
| 9 | 16.16 | 500; 430 | 10 | 5.48 |
| 10 | 16.50 | 510; 501; 431 | 16 | 5.37 |
| 11 | 18.27 | 440; 225 | 5 | 4.86 |
| 12 | 18.89 | 006; 530 | 16 | 4.70 |
| 13 | 19.47 | 600 | 7 | 4.56 |
| 14 | 20.48 | 602 | 55 | 4.34 |
| 15 | 20.95 | 335 | 5 | 4.24 |
| 16 | 21.44 | 425 | 35 | 4.14 |
| 17 | 22.00 | 631 | 43 | 4.04 |
| 18 | 22.40 | 107 | 7 | 3.97 |
| 19 | 24.00 | 227 | 11 | 3.71 |
| 20 | 24.30 | 642 | 39 | 3.66 |
| 21 | 24.72 | 535 | 10 | 3.60 |
| 22 | 25.38 | 650 | 4 | 3.51 |
| 23 | 26.21 | 652 | 11 | 3.40 |
| 24 | 26.40 | 218 | 16 | 3.38 |
| 25 | 26.56 | 733 | 8 | 3.36 |
| 26 | 27.21 | 653; 308 | 27 | 3.28 |
| 27 | 28.00 | 715; 555 | 8 | 3.19 |
| 28 | 28.30 | 527 | 41 | 3.15 |
| 29 | 29.69 | 753 | 100 | 3.01 |
| 30 | 30.14 | 920; 760 | 16 | 2.97 |
| 31 | 30.45 | 726 | 18 | 2.94 |
| 32 | 30.84 | 850 | 22 | 2.90 |
| 33 | 31.04 | 930 | 3 | 2.88 |
| 34 | 31.51 | 852 | 5 | 2.84 |
| 35 | 32.04 | 904 | 9 | 2.79 |
| 36 | 32.56 | 816; 746 | 10 | 2.75 |
| 37 | 33.30 | 3; 0; 10 | 23 | 2.69 |
| 38 | 34.34 | 952 | 6 | 2.61 |
| 39 | 34.75 | 10; 2; 3 | 5 | 2.58 |
| 40 | 35.30 | 10; 4; 0; 916 | 3 | 2.54 |
| 41 | 36.31 | 2; 2; 11 | 12 | 2.47 |
| 42 | 36.95 | 719; 559 | 3 | 2.43 |
| 43 | 38.41 | 0; 0; 12 | 10 | 2.34 |

EXAMPLE 2

A glass composition comprising $4Li_2O:Al_2O_3:9SiO_2$ was comminuted and slurried with deionized water utilizing a water to solids ratio of 5. The slurry was then maintained at 35° C. to 60° C. and tumbled for 33 days. Unreacted glass and crystals were obtained. The product showed a cyclohexane sorption of 15 percent by weight and water sorption of 22 percent by weight. Quantitative analysis showed a molar ratio composition of $$Li_2O:Al_2O_3:SiO_2$$

of 1.35:1:4.75. The crystals were examined by X-ray diffraction analysis.

EXAMPLE 3

The process of Example 2 was repeated employing a glass composition comprising $$6Li_2O:Al_2O_3:9SiO_2$$

Unreacted glass and crystals were obtained. The crystals were examined by X-ray diffraction analysis and compared to the analysis of the composition of Example 2. The results of both analyses are summarized in Table II. The X-ray patterns of the crystals of Examples 2 and 3 were found to be identical.

EXAMPLE 4

The process of Example 1 was repeated with a glass having a mol ratio of $2Li_2O:Al_2O_3:4SiO_2$. The procedure differed from that of Example 1 in that the mixture was rotated at 2 r.p.m. in a constant temperature bath at 55° C. to 60° C. for 58 days as compared to the agitation period of 30 days used in Example 1. The product obtained after this period of time was analyzed and found to contain crystals of ZSM–2 zeolite and unreacted glass.

TABLE II.—X-RAY ANALYSIS OF PRODUCTS OF EXAMPLES 2 AND 3

| d(A.) | I/I₀ | d(A.) | I/I₀ |
|---|---|---|---|
| 13.75 | VS | 3.15 | m |
| 11.9 | m | 3.00 | m-2 |
| 7.09 | m | 2.85 | m |
| 7.00 | m | 2.68 | m |
| 5.60 | m-6 | 2.46 | w |
| 5.40 | w | 2.32 | w |
| 4.35 | m | 2.28 | w |
| 4.15 | m | 2.14 | w |
| 4.02 | m | 1.97 | w |
| 3.65 | m | 1.90 | w |
| 3.3–2.40 | m | 1.86 | w |

EXAMPLE 5

This example illustrates a method for manufacturing ZSM–2 zeolite employing the method of Example 4 but utilizing as a starting material a glass composition having slightly higher percentages of both $LiO_2$ and $SiO_2$ as compared to the glass composition employed in Example 4. The process of Example 4 was repeated with a glass comprising $3LiO_2:Al_2O_3:6SiO_2$. A mixture of ZSM–2 crystals and unreacted glass were identified in the reaction product mixture.

EXAMPLE 6

An amorphous glass composition having the mol ratio $2LiO_2:Al_2O_3:6SiO_2$ was comminuted and mixed with water in the ratio of 5 parts of water to 1 part of glass. The mixture was then placed in a soda-lime-silica glass bottle and allowed to stand motionless for a period of 45 days, with the temperature maintained at 60° C. The procedure differed from Example 1 in that a glass container was used in place of a polypropylene container and the mixture was not agitated. The resulting product was found upon analysis to contain a mixture of ZSM–2 crystals and lithium silicate.

EXAMPLE 7

A glass composition comprising $3LiO_2:1Al_2O_3:6SiO_2$ was treated according to the method of Example 6. The reaction time however, was increased from 45 days to 50 days. The reaction mixture was analyzed and found to contain ZSM–2 zeolite and lithium silicate.

Results and conditions of Examples 1 to 7 are summarized in Table III:

ing a liquid hourly space velocity of 32, a catalyst to oil ratio of 1.5, using the aluminosilicate in the form of 5-10

TABLE III.—SUMMARY OF EXAMPLES 1 TO 7

| Example number | Glass Composition Li₂O:Al₂O₃:SiO₂ | Temperature, °C. | Time, days | Water/Solids Ratio | Vessel and Motion [1] | Species [2] |
|---|---|---|---|---|---|---|
| 1 | 4:1:9 | 55-60 | 32 | 5 | Polypropylene, 2 r.p.m | ZSM-2 |
| 2 | 4:1:9 | 35-60 | 33 | 5 | do | ZSM-2+GR |
| 3 | 6:1:9 | 35-60 | 33 | 5 | do | ZSM-2+GR |
| 4 | 2:1:4 | 35-60 | 58 | 5 | do | ZSM-2+GR |
| 5 | 3:1:6 | 35-60 | 58 | 5 | do | ZSM-2+GR |
| 6 | 2:1:6 | 60 | 45 | 5 | Glass, 0 r.p.m | LS+(ZSM-2) |
| 7 | 3:1:6 | 60 | 50 | 5 | do | LS+(ZSM-2) |

[1] Soda-lime-silica glass bottle and no motion was used for Example 6 and 7. Polypropylene bottle and tumbling at 2 r.p.m. was used for other batches.
[2] LS=lithium silicate and GR=unreacted glass.

EXAMPLE 8

Eighty grams of amorphous glasses of the oxide mole ratio Li₂O—Al₂O₃—SO₂ of 6:1:9 were ground to −250 mesh and slurried with 400 ml. of water in a polypropyene bottle. The mixture was maintained at room temperature (about 20° C.) for 3 days and thereafter was tumbled at 2 r.p.m. for 9 days at 35° C. and then for 60 days at 55° C. A sample of the crystalline reaction product, 10 grams, was extracted four times with 250 cc. portions of 0.1 N aqueous sodium hydroxide solution. The resulting products showed a cyclohexane sorption of 15 percent by weight and water sorption of 22 percent by weight. Quantitative analysis showed that the lithium content of the initially obtained crystalline material had been completely replaced by sodium and that the product had a molar ratio composition of Na₂O:Al₂O₃:SiO₂ of 1:1:3.45. Such product, upon being subjected to X-ray diffraction analysis, showed an X-ray pattern as set forth in Table IV.

EXAMPLE 9

Eighty grams of amorphous glass of the oxide mole ratio Li₂O—Al₂O₃—SiO₂ of 4:1:6 were ground to −250 mesh and slurried with 320 ml. of water. The mixture was maintained at a temperature in the range of 40° C. to 60° C. for a period of three months. The resulting product, containing unreacted glass, sorbed 8.4 weight percent cyclohexane, indicating over 50 percent content of crystalline material.

TABLE IV.—X-RAY ANALYSIS OF PRODUCT OF EXAMPLE 8

| 2θ | d(A.) | I/I max |
|---|---|---|
| 6.25 | 14.4 | 100 |
| 7.20 | 12.3 | 23 |
| 10.06 | 8.8 | 22 |
| 11.90 | 7.44 | 11 |
| 12.43 | 7.10 | 10 |
| 15.57 | 5.68 | 25 |
| 16.00 | 5.55 | 6 |
| 17.56 | 5.05 | 3 |
| 17.86 | 4.95 | 4 |
| 18.75 | 4.74 | 5 |
| 18.95 | 4.68 | 3 |
| 20.30 | 4.37 | 18 |
| 21.35 | 4.16 | 9 |
| 21.70 | 4.09 | 19 |
| 23.98 | 3.71 | 22 |
| 26.10 | 3.41 | 30 |
| 26.95 | 3.31 | 17 |
| 28.10 | 3.18 | 13 |
| 29.60 | 3.01 | 43 |
| 29.95 | 2.97 | 14 |

The product, in the form of a wet cake, was exchanged ten times with lanthanum chloride, each batch consisting of wet cake and 250 cc. of 2.5 weight percent aqueous solution of lanthanum chloride. One portion of the resulting product was steamed for 24 hours at 1200° F. at a pressure of 16 p.s.i.g. The steamed sample was found to be completely amorphous.

Another portion of the unsteamed lanthanum aluminosilicate product was employed as a catalyst in the catalytic cracking of a petroleum charge stock boiling in the range of 450° F. to 950° F. Cracking was carried out employing mesh particles at a temperature of 905° F. The cracking results are shown below in Table V:

TABLE V

| | Percent |
|---|---|
| Conversion | 60.49 |
| C₄-free motor gas | 48.19 |
| C₄ | 14.35 |
| Dry gas | 5.18 |
| Coke | 4.42 |

EXAMPLE 10

Sixty five grams of amorphous glass of the oxide mole ratio Li₂O—Al₂O₃—SiO₂ of 4:1:9 were slurried in finely divided form with 200 ml. of water. The mixture was maintained at a temperature in the range of 40° C. to 60° C. for a period of three months. The resulting product sorbed 7.2 weight percent cyclohexane, indicating about 50 percent crystallinity.

The product, in the form of a wet cake, was exchanged six times with 250 ml. portions of 15 weight percent aqueous solution of rare earth metal chloride. The resulting product, upon analysis, showed the following content:

| | Weight percent |
|---|---|
| Li₂O | 0.7 |
| Al₂O₃ | 11.2 |
| SiO₂ | 45.6 |
| Rare earth oxides | 39.4 |

One portion of this product was steamed for 24 hours at 1200° F. at a pressure of 16 p.s.i.g. The steamed sample was found to be completely amorphous.

Another portion of the unsteamed rare earth aluminosilicate was employed as a catalyst in the catalytic cracking of a petroleum charge stock under the conditions noted above in Example 9. The cracking results are shown below:

TABLE VI

| | Percent |
|---|---|
| Conversion | 50.57 |
| C₄-free motor gas | 41.71 |
| C₄ | 9.47 |
| Dry gas | 3.92 |
| Coke | 4.60 |

EXAMPLE 11

Purified samples of ZSM-2 crystalline aluminosilicate were analyzed quantitatively to determine chemical composition. ZSM-2 was found to have the following composition:

$$M_{2/n}O \cdot Al_2O_3 \cdot 3.3{-}4.0SiO_2 \cdot 2H_2O$$

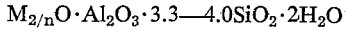

It is postulated without being so limited that crystallization of the lithium aluminosilicate described herein occurs upon dissolution of the amorphous lithium oxide-alumina-silica glass of specified composition in aqueous slurry to yield a supersaturated solution of lithia, alumina and silica and subsequent formation of nuclei of the zeolite crystals in solution or at the glass-solution interface. Under controlled temperature conditions, it is believed that the species designated herein as ZSM-2 is nucleated and crystallized in preference to other species.

The crystalline aluminosilicate ZSM-2 described herein may be utilized in ion exchange processes, as well as the separation of mixtures of compounds having different molecular shapes. The aluminosilicate composition further finds application as a catalyst in various hydrocarbon conversion processes such as polymerization, alkylation, dealkylation, isomerization and the like.

The aluminosilicate composition of this invention has particular value as a hydrocarbon cracking catalyst. It has been recently discovered that crystalline aluminosilicates when subjected to certain modifications may be converted into catalysts of extraordinarily high activity. More specifically, it has been found that when certain ions such as rare earth ions, ammonium ions or hydrogen ions or any combination thereof are exchanged for the replaceable cations of specified crystalline zeolites, hydrocarbon conversion catalysts of excellent selectivity and activity are achieved. The crystalline aluminosilicate of the present invention, XSM-2, can be treated in a like manner.

While the invention has been particularly described with reference to the preferred embodiments for the manufacture and use of the novel zeolite composition, it will be understood that various changes in the methods and composition for synthesizing the zeolite or methods for utilizing the novel zeolite in any type of process known in the prior art may be made without departing from the spirit and scope of the invention.

I claim:
1. A method for synthesizing a crystalline lithium aluminosilicate having the chemical composition $LiO_2 \cdot Al_2O_3 \cdot (3.3-4.0)SiO_2 \cdot ZH_2O$ wherein Z represents the number of moles of water of hydration, said aluminosilicate having an X-ray diffraction pattern as shown in the accompanying Table I and being indexable in the tetragonal system which comprises contacting a finely divided amorphous glass having a chemical composition of (2 to 6)$Li_2O$:$Al_2O_3$:(4 to 9)$SiO_2$ with excess water at a temperature between about 20° C. and about 100° C. and digesting the resultant reaction mixture until crystals of said aluminosilicate are formed.

2. A method according to claim 1 wherein said amorphous glass is contacted with water at a temperature between about 20° C. and 30° C. for a perior sufficient to effect nucleation of said crystalline lithium aluminosilicate and raising the temperature to between about 30° C. and 100° C. until crystallization of said nucleated aluminosilicate is completed.

3. A crystalline aluminosilicate composition having the following chemical composition:

$$M_{2/n}O \cdot Al_2O_3 \cdot (3.3-4.0)SiO_2 \cdot ZH_2O$$

wherein M is a metal having a valence of $n$ and Z represents the number of moles of water of hydration, said aluminosilicate having an X-ray diffraction pattern, in its lithium form, as shown in the accompanying Table I, said aluminosilicate being indexable in the tetragonal system.

4. A crystalline aluminosilicate composition of claim 3 wherein the metal M is lithium.

5. A crystalline aluminosilicate composition having the following chemical composition:

$$Na_2O \cdot Al_2O_3 \cdot (3.3-4.0)SiO_2 \cdot ZH_2O$$

wherein Z represents the number of moles of water of hydration, said aluminosilicate having an X-ray diffraction pattern as shown in the accompanying Table IV, said aluminosilicate being indexable in the tetragonal system.

6. A composition which comprises the composition of claim 3, further characterized by being ion exchanged with ions selected from the group consisting of hydrogen ions and ammonium ions.

7. The composition of claim 3 wherein said M is selected from rare earth metal cations.

References Cited

UNITED STATES PATENTS

| | | | |
|---|---|---|---|
| 3,008,803 | 11/1961 | Milton | 23—113 |
| 3,123,441 | 3/1964 | Haden et al. | 23—113 |
| 3,130,007 | 4/1964 | Breck | 23—113 |
| 3,140,322 | 7/1964 | Frilette et al. | 252—455 X |
| 3,236,762 | 2/1966 | Rabo et al. | 208—111 |

EDWARD J. MEROS, *Primary Examiner.*